(12) United States Patent
Wong et al.

(10) Patent No.: US 11,641,979 B2
(45) Date of Patent: May 9, 2023

(54) CULINARY WHISK

(71) Applicant: Dandre Technology Innovation Limited, Hong Kong (HK)

(72) Inventors: Shu Yen Wong, Hong Kong (HK); Andre Ludwig, Hong Kong (HK)

(73) Assignee: Dandre Technology Innovation Limited, Hong Kong (HK)

( * ) Notice: Subject to any disclaimer, the term of this patent is extended or adjusted under 35 U.S.C. 154(b) by 162 days.

(21) Appl. No.: 17/095,768

(22) Filed: Nov. 12, 2020

(65) Prior Publication Data

US 2022/0142412 A1     May 12, 2022

(51) Int. Cl.
*A47J 43/10*     (2006.01)

(52) U.S. Cl.
CPC .................. *A47J 43/1093* (2013.01)

(58) Field of Classification Search
CPC ........ A47J 43/10; A47J 43/1093; A47J 43/28; A47J 43/1087
USPC ...................... 366/129, 309, 326.1; 416/70 R
See application file for complete search history.

(56) References Cited

U.S. PATENT DOCUMENTS

| | | | | |
|---|---|---|---|---|
| 1,617,787 A * | 2/1927 | Andrews, Jr. | ....... | A47J 43/1087 241/301 |
| 1,986,163 A * | 1/1935 | Rockwell | ............ | A47J 43/1087 416/70 R |
| 3,991,983 A * | 11/1976 | Drynan | ................ | A47J 43/1087 366/129 |
| 5,219,223 A * | 6/1993 | Schmitt | ............... | A47J 43/1093 416/227 R |
| 6,264,356 B1 | 7/2001 | Bourner | | |
| 8,313,228 B2 * | 11/2012 | Reay | ................... | A47J 43/1093 366/117 |
| 2006/0050606 A1 * | 3/2006 | Overthun | ............ | A47J 43/1093 366/129 |
| 2013/0058183 A1 * | 3/2013 | Waibel | ................ | A47J 43/1093 366/129 |
| 2016/0287020 A1 * | 10/2016 | Horito | ..................... | B01F 23/50 |

FOREIGN PATENT DOCUMENTS

WO     WO-2011069768 A1 *   6/2011   .......... A47J 43/1093

OTHER PUBLICATIONS

R, Daniel, English Translated Specification of Patent Application WO 2011069768 A1 (Year: 2011).*

* cited by examiner

*Primary Examiner* — David L Sorkin
(74) *Attorney, Agent, or Firm* — Melvin Li

(57) ABSTRACT

The present invention is concerned with a culinary whisk with an elongate profile defining a longitudinal axis and having a proximal end and a distal end, comprising a handle portion and a utility portion, wherein the utility portion includes a plurality of wire loops, and wherein the wire loop has an asymmetric profile and includes an upper elongate leg portion and a lower foot portion and wherein each wire loop has a web member extending across a wire segment of the lower foot portion.

12 Claims, 17 Drawing Sheets

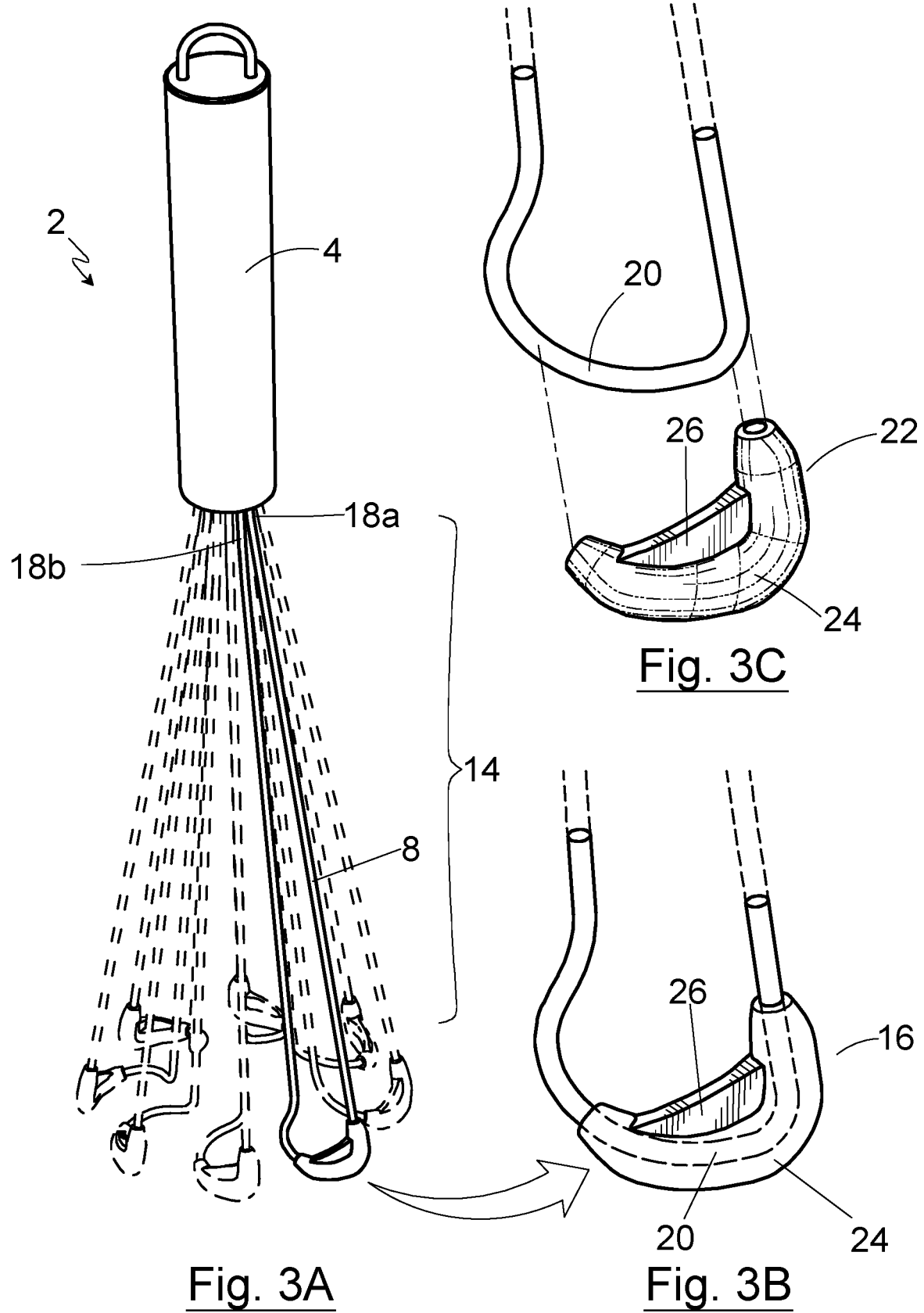

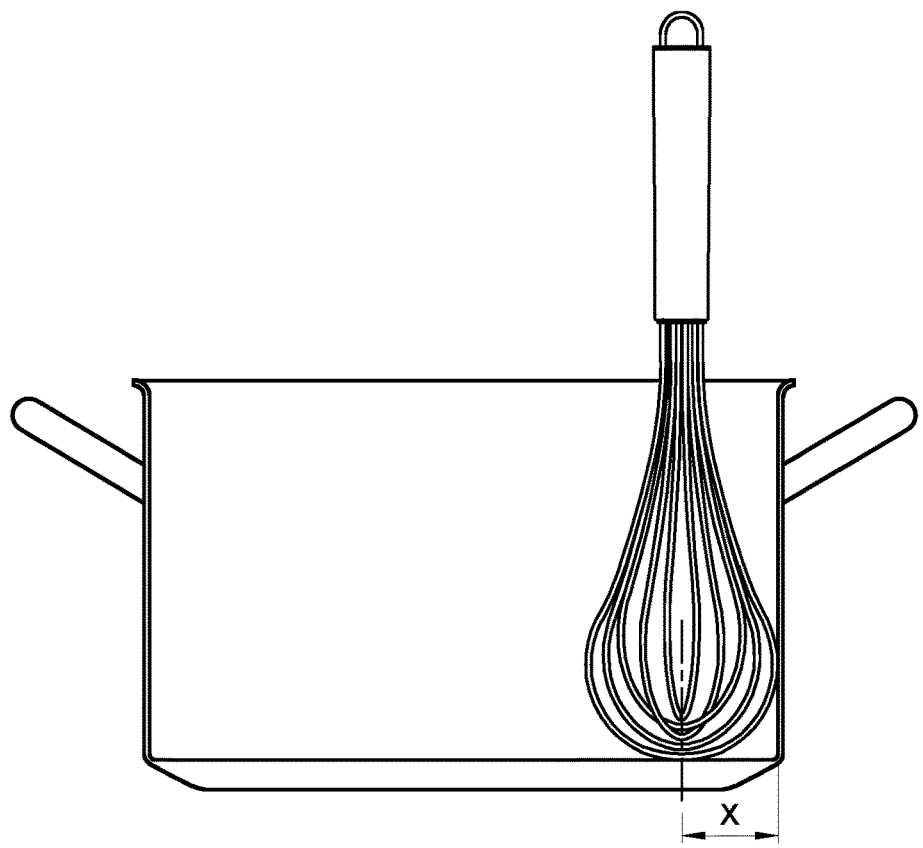
Prior Art - Fig. 5A
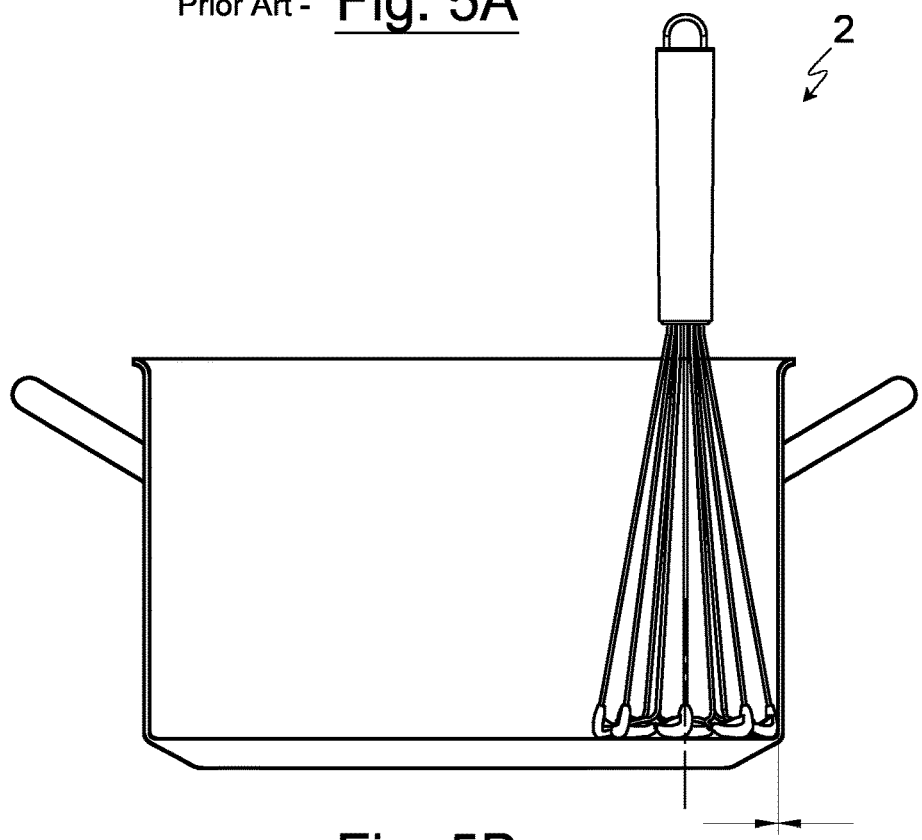
Fig. 5B

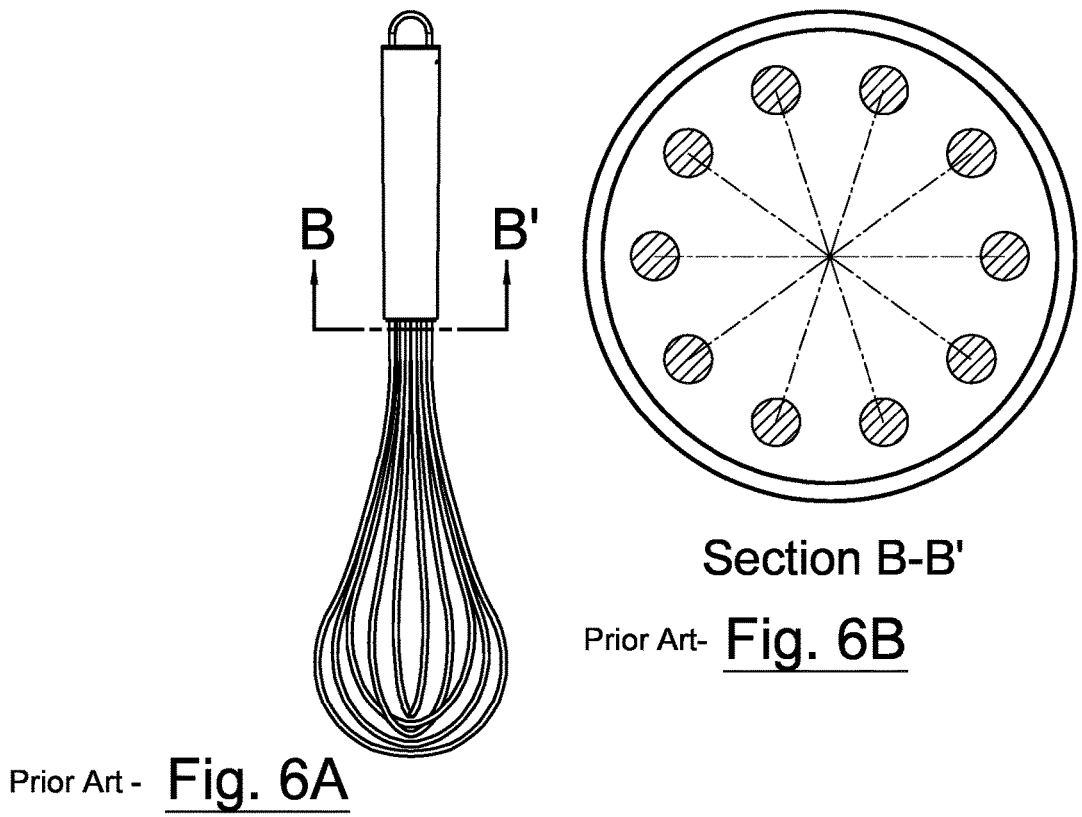
Prior Art - Fig. 6A
Section B-B'
Prior Art - Fig. 6B
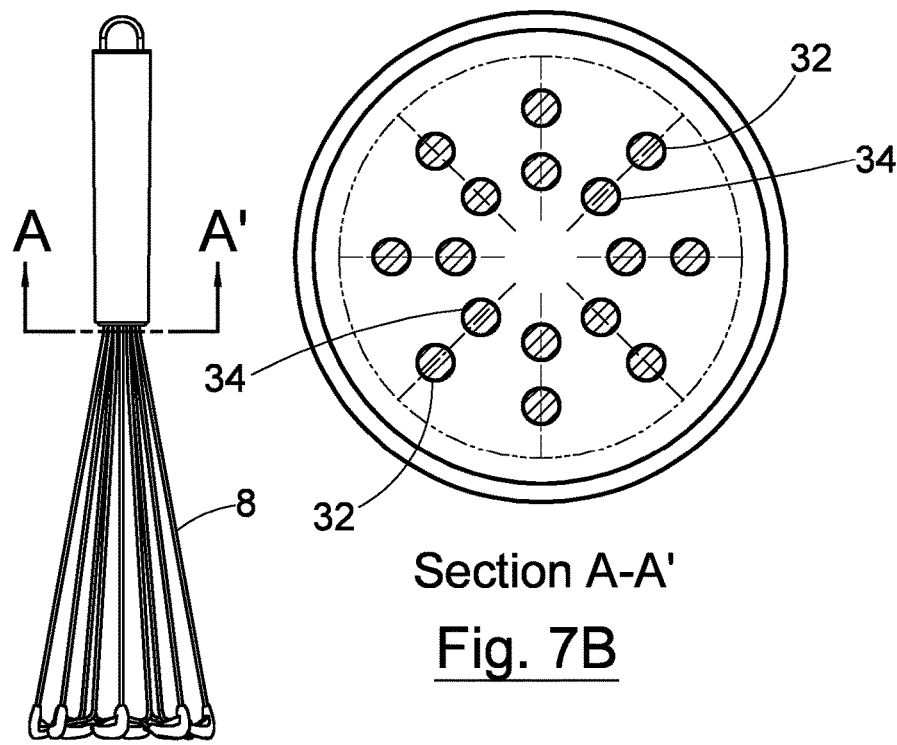
Fig. 7A
Section A-A'
Fig. 7B

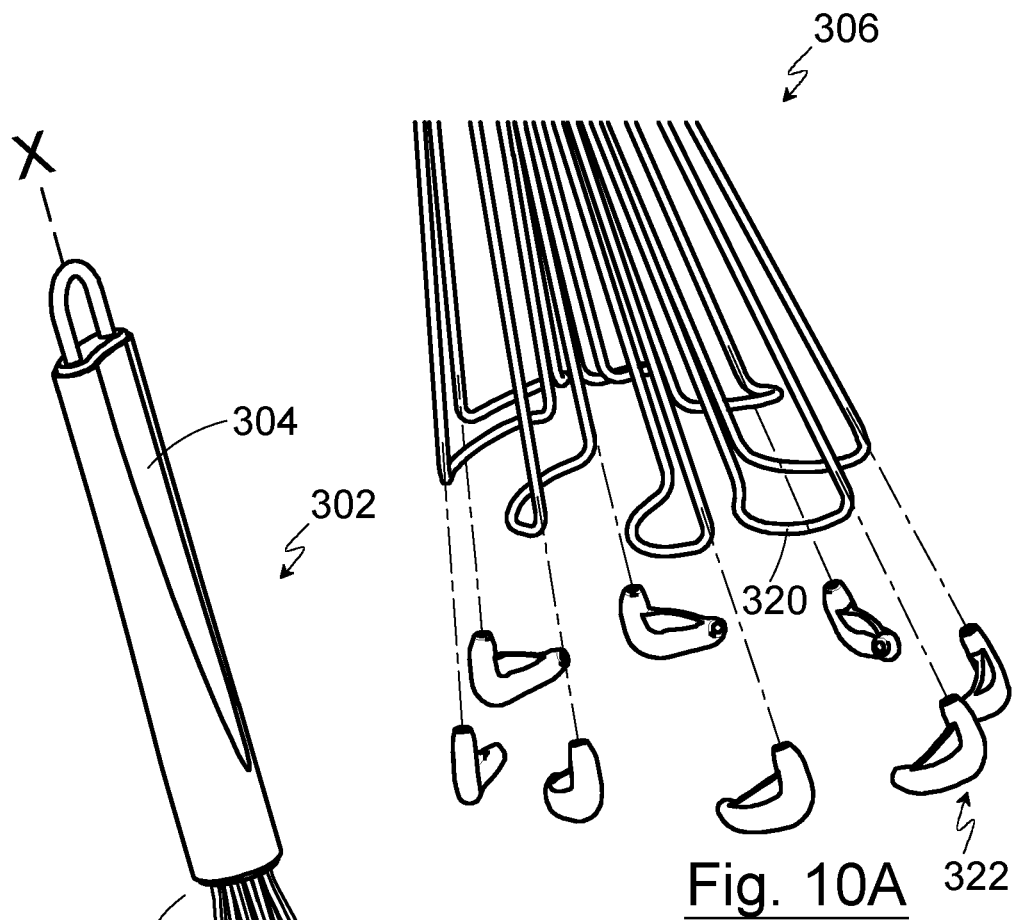
Fig. 10A
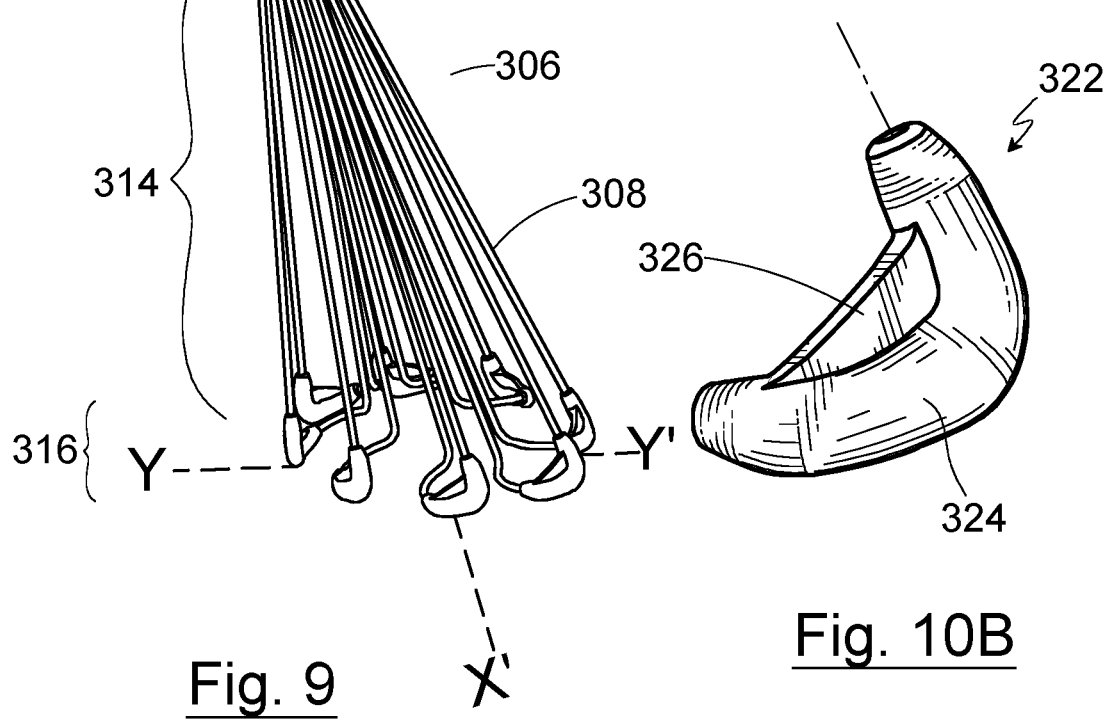
Fig. 9
Fig. 10B

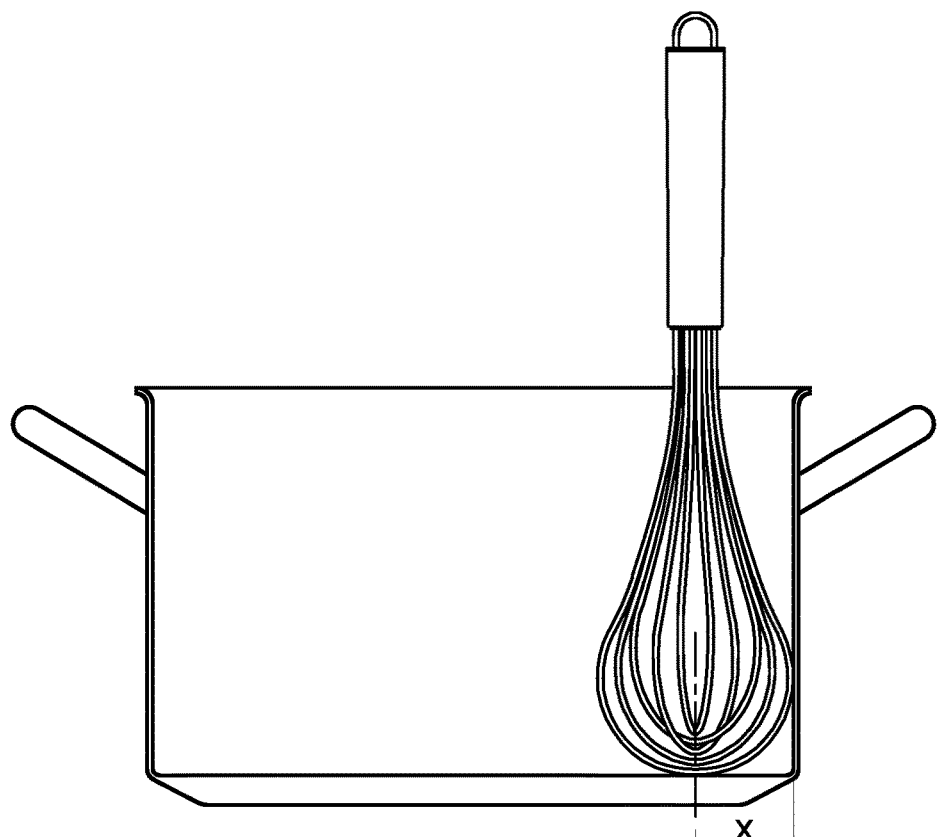
Prior Art - Fig. 14A
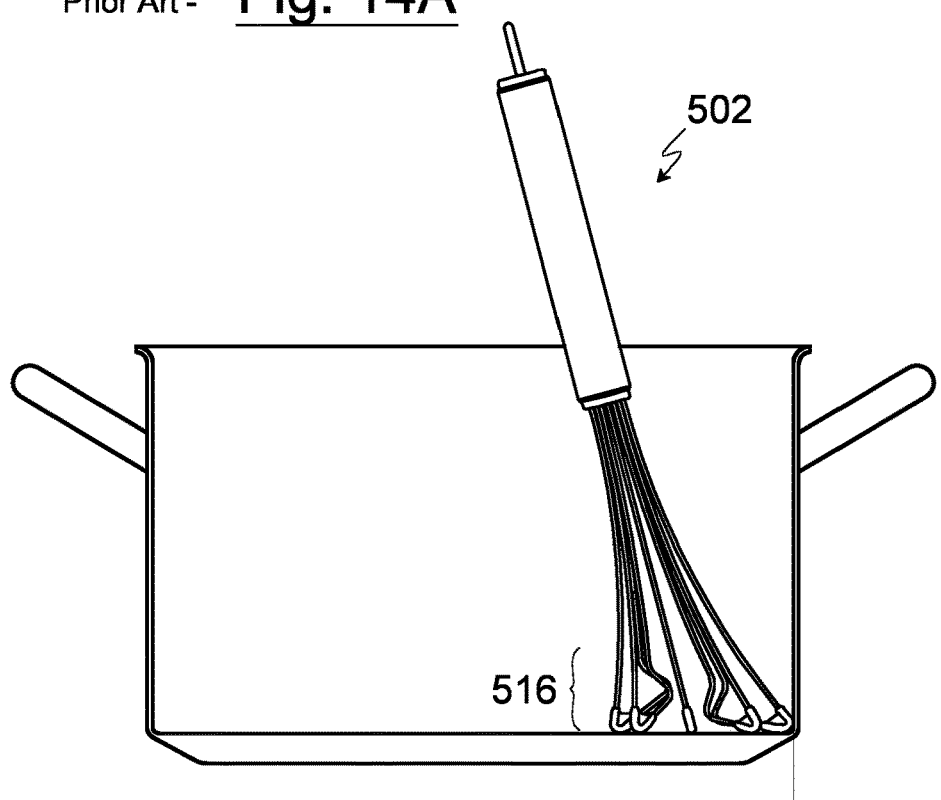
Fig. 14B

CULINARY WHISK

FIELD OF THE INVENTION

The present invention is concerned with an improved culinary whisk.

BACKGROUND OF THE INVENTION

There are a variety of conventional culinary whisks in the market. They are constructed with different designs for use in different scenario. Food preparation and food mixing or whisking is a tedious task. On one hand, there are issues of whisking efficiency, thoroughness and evenness. On the other hand, there are issues of ease of operation of the whisk. For example, many users, especially users with smaller or weaker hands (e.g. users with carpal tunnel syndrome), often find this task difficult or tiring. There are also issues of how the whisk may interact with the container in which the food being mixed is contained. As such, while there are many different whisk designs in the market, users often still find them with inadequate performance.

Accordingly, the present invention seeks to provide an alternative which, among other advantages, allows a user to mix food effectively and efficiently, or at least to provide a useful alternative to the public.

SUMMARY OF THE INVENTION

According to a first aspect of the present invention, there is provided with a culinary whisk with an elongate profile defining a longitudinal axis and having a proximal end and a distal end, comprising a handle portion and a utility portion, wherein the utility portion includes a plurality of wire loops, wherein each wire loop has an asymmetric profile and includes an upper elongate leg portion and a lower foot portion, and wherein each wire loop a web member extending across a wire segment of said lower foot portion.

Preferably, the wire loops may be non-overlaying with each other, and wherein the lower foot portions may be outwardly oriented and/or radially extending.

Suitably, the wire loops may extend from a front end of the handle portion with a narrower width or diameter of the whisk and expand to the distal end with a largest width of the whisk, wherein the lower foot portions (resembling pointed regions) together define the largest width, and wherein the lower foot portions are arranged at the farthest location from the handle portion.

Advantageously, the longitudinal axis may run along the handle portion, wherein the wire loops may be of equal length with the distal end defining a plane disposed perpendicularly to the longitudinal axis whereby the whisk can stand vertically on itself at the distal end, and wherein the wire loops together generally resemble a symmetric or conical structure.

In an embodiment, the wire loops may be of non-equal length with the distal end defining a plane disposed non-perpendicularly or oblique to the longitudinal axis, and wherein the wire loops together generally may resemble an asymmetric structure.

In one embodiment, each said wire loop may define a structure with a three-dimensional profile. Alternatively, each said wire loop may defines a structure with a non-three-dimensional profile or planar profile.

According to a second aspect of the present invention, there is provided with a culinary whisk with an elongate profile defining a longitudinal axis and having a proximal end and a distal end, comprising a handle portion and a utility portion, wherein the utility portion may include a plurality of non-overlaying wire loops, and wherein each said wire loop may include an upper elongate leg portion and a lower foot portion.

Preferably, each wire loop may assume an asymmetric profile and is provided a web member extending across a wire segment of the lower foot portion.

Suitably, the wire loops may extend from a front end of the handle portion with a narrower width or diameter of the whisk and expand to the distal end with a largest width or diameter of the whisk, wherein the lower foot portions may be arranged at the farthest location from said handle portion along the longitudinal axis of the whisk, and wherein the lower foot portions together define the largest width of the whisk.

Advantageously, the wire loops may be of equal length with the distal end thereof defining a plane disposed perpendicularly to the longitudinal axis whereby the whisk can stand vertically on itself at the distal end, and wherein the wire loops together generally resemble a conical structure.

In an embodiment, the wire loops may be of non-equal length with the distal end thereof defining a plane disposed non-perpendicularly or oblique to the longitudinal axis, and wherein the wire loops together generally may resemble an asymmetric structure.

In one embodiment, each said wire loop may define a structure with a three-dimensional profile. Alternatively, each said wire loop may define a structure with a non-three-dimensional profile or planar profile.

According to a third aspect of the present invention, there is provided with a culinary whisk with an elongate profile and defining a longitudinal axis having a proximal end and a distal end, comprising a handle portion with a rear end and a front end and a utility portion, wherein:
the utility portion includes a plurality of non-overlaying wire loops,
each said wire loop includes an upper elongate leg portion extending from the front end of the handle portion and a lower foot portion, and
each said wire loop is provided with a web member extending across a wire segment of said lower foot portion.

Preferably, along the longitudinal axis:
the wire loops may extend from the front end of the handle portion with a narrower width or diameter of the whisk and expand to the distal end with a largest width of the whisk,
the lower foot portions together may define the largest width of the whisk, and
the web may be made of a polymeric material.

Suitably, the wire loops may be of equal length with the distal end defining a plane disposed perpendicularly to the longitudinal axis whereby the whisk can stand vertically on the distal end, and wherein the wire loops together generally may resemble an asymmetric structure or conical structure.

Advantageously, the wire loops may be of non-equal length with the distal end defining a plane disposed non-perpendicularly or oblique to the longitudinal axis, and wherein the wire loops together generally may resemble an asymmetric structure.

In an embodiment, each said wire loop may define a structure with a three-dimensional profile. Alternatively, each said wire loop may define a structure with a non-three-dimensional profile or planar profile.

BRIEF DESCRPTION OF THE DRAWINGS

Some embodiments of the present invention will now be explained, with reference to the accompanied drawings, in which:

FIG. 3A is a schematic diagram of the whisk of FIG. 1, but with portions the whisk illustrated in dashed lines and the remaining portions (handle portion and one wire loop) of the whisk illustrated in solid lines;

FIG. 3B is a schematic diagram of a lower portion of the solid lined wire loop of the whisk of FIG. 3A;

FIG. 3C is an exploded view of the lower portion of FIG. 3B, showing the lower portion essentially made of a wire segment and a surface area increasing member;

FIG. 5A is a schematic diagram showing a conventional balloon whisk resided in a pot for comparison purpose, and FIG. 5B is a schematic diagram showing the whisk of FIG. 1 resided in a similar pot;

FIG. 6A is side view of the conventional balloon whisk of FIG. 5A;

FIG. 6B is a cross sectional view taken at B-B' of FIG. 6A;

FIG. 7A is side view of the conventional balloon whisk of FIG. 5B;

FIG. 7B is a cross sectional view taken at A-A' of FIG. 5B;

FIG. 9 is a perspective view of a fourth embodiment of a whisk according to the present invention;

FIG. 10A is a schematic diagram showing an exploded view of a lower portion of a utility portion of the whisk of FIG. 9;

FIG. 10B is an enlarged view showing of one surface area increasing member of the whisk of FIG. 9;

FIG. 14A is a schematic diagram showing a conventional balloon whisk resided in a pot for comparison purpose, and FIG. 14B is a schematic diagram showing the whisk of FIG. 13A resided in a similar pot;

PREFERRED EMBODIMENTS OF THE INVENTION

Although there are a variety of culinary whisks in the market, they suffer from different disadvantages. For example, one conventional culinary whisk is known as balloon whisk. Please see for example FIG. 5A. Such a whisk generally comprises a handle portion and a utility portion. This whisk is called a balloon whisk because the shape of the utility portion resembles a balloon. The utility portion is made of a plurality of separate but overlaying wire loops extended from the handle portion. It can be envisaged that when the whisk is viewed from the rear end thereof, the wire loops thereof are overlaying of each other. The inner wire loops are smaller (and shorter) than the outer wire loops. Each wire loop, or at least the distal end of each wire loop, is generally elliptical in shape. Research leading to the present invention indicates that such a whisk does not sufficiently provide efficient or effective whisking effect. Further, due to the overall balloon shape of the utility portion, the whisk often would not be able to gain access to food or fluid adhered to a certain region of a mixing container which, for example, has a generally vertical side wall and flat bottom (or narrow corners). There are other culinary whisks in the market, although they still suffer one disadvantage or another.

The present invention is thus concerned with an improved culinary whisk, and is illustrated and explained by way of examples below.

Figures 1, 2:
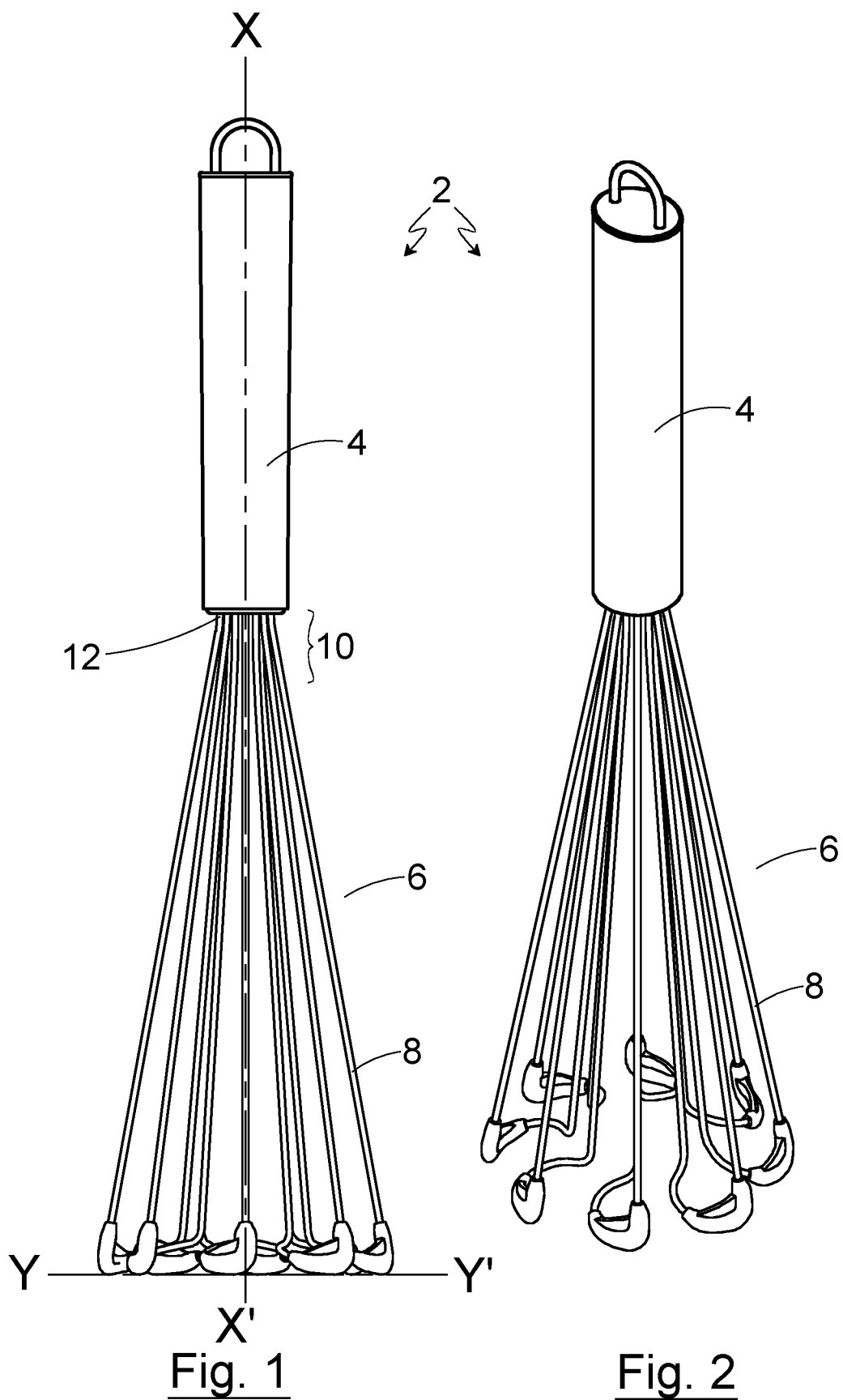
FIG. 1 is a side view of a first embodiment of a whisk according to the present invention.
FIG. 2 is a perspective view of the whisk of FIG. 1.

FIG. 1 is a side view of a first embodiment of an elongate culinary whisk, generally designated 2. FIG. 2 is a perspective view of the whisk 2 with a proximal end and a distal end and defining a longitudinal axis X-X'. The whisk 2 comprises two main portions, namely a handle portion 4 with a rear end and a front end in the form of a cylindrical stick and a utility portion 6 extended from the front end of the handle portion 4 in that the longitudinal axis X-X' also runs through the handle portion 4. The utility portion 6 includes a plurality of separate but non-overlaying wire loops 8. FIG. 4A, viewing from the rear end of the whisk 2, clearly shows that the wire loops 8 are non-overlaying, and are not in contact with each other. In this embodiment, there are eight such wire loops. In alternative embodiments, providing four to twelve wire loops would also be workable. From FIGS. 1, 2 and 3A, it can been seen that the overall shape of the utility portion 6 has a conical profile in that the bottom surface defines a plane Y-Y' and is generally circular or of a circle, and ends 10 of the wire loops 8 converge to a relatively small end surface 12 provided by and connected to the distal end of the handle portion 4. The ends 10 together thus define a narrower (or narrowest) width or diameter of the whisk. In other words, the utility portion 6 has a symmetric structure, and the plane Y-Y' is disposed perpendicular to the longitudinal axis X-X'. As such, the whisk 2 can rest on a flat surface standing on the utility portion 6/wire loops 8, as illustrated in FIG. 1. In other words, the whisk 2 can be free-standing on its own.

FIG. 3A corresponds to FIGS. 1 and 2 although all but one wire loop are indicated in dotted lines and the remaining wire loop 8 and the handle portion 4 are indicated in solid lines for illustrative reasons. It can be seen that the wire loop 8 extends downwardly and outwardly away from the handle portion 4 from its ends. Towards the distal end of the whisk 2, the wire loops 8 flare apart. Each wire loop 8 includes an upper portion (or a leg portion) 14 and a lower portion (or a foot portion) 16. The leg portion 14 (of each wire loop 8) starts off with opposite ends or two portions 18a, 18b of the wire (loop 8) positioned adjacent each other. The opposite ends 18a, 18b of the wire loops together form the ends 10 at the front end of the handle portion 4. However, moving further down the leg portion 14, adjacent wire portions of the loop 8 are gradually more separately spaced apart and then transition to the foot portion 16. The leg portion 14, or the wire portions thereof, generally defines a first plane illustrated by line A (for simplicity reason). Please also see FIG. 4A. The foot portion 16, also being part of the wire loop 8, extends sideway or radially from the leg portion 14. The foot portion 16, or its wire portion, generally defines a second plane illustrated by the hasked area B (for simplicity reason). The first plane A and the second plane B together thus defines an intersecting angle. Please still see FIG. 4A. In this embodiment, the foot portion 16 extends sideway generally along or parallel to a tangent of the circle of the utility portion 6. Although each leg portion 14 and each foot portion 16 is of a planar profile, the leg portion 14 and the foot portion 16 as a whole however defines a three-dimensional structure. Please see FIGS. 3A and 3B.

FIG. 3B is an enlarged view showing a lower end (or distal end) of the leg portion 14 and the foot portion 16 extended therefrom. FIG. 3C is an exploded view showing a more detailed construction of the foot portion 16. The foot portion 16 includes a segment 20 of the wire loop 8 and a member 22 configured partially for increasing the surface area of the wire loop 8 or at least the segment 8 of the wire loop 8. This member 22 can be understood as a mixing enhancer. The member 22 has two main parts, namely a first part 24 which envelopes the segment 20 of the wire loop 8, and a second part 26 which spans across the wire loop segment 20. From FIGS. 3B and 3C, it can be seen that the first part 24 resembles a jacket that envelopes the wire segment 20 for increasing the circumference of the wire segment 20 while the second part 26 resembles a fin or a web spanning across segment 20 for further increasing the surface area. In other words, the surface area of the segment 20 of the wire loop is increased in a two-fold manner, i.e. firstly by providing the jacket 24 to the wire loop segment 20 in order to increase the width or diameter of the wire segment 20 thus the surface area thereof, and secondly by providing the web 26 across the wire loop segment 20 to generate an additional whisking surface area. It is important to be noted that the jacket 24 only envelopes the particular wire loop segment 20 of the foot portion 16, and not all the way along the length of the entire wire loop 8.

Figure 3G:
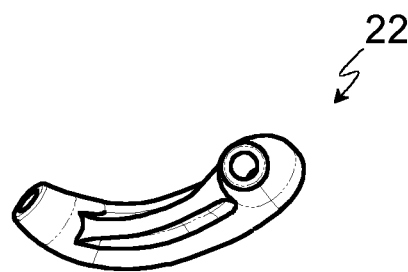
FIGS. 3D, 3E, 3F and 3G are front view, left side view, right side view and top view of the surface area increasing member of FIG. 3C, respectively.
Figure 3E:
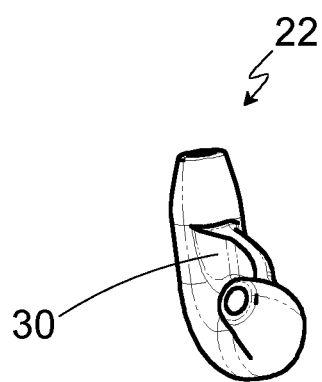
Figure 3D:
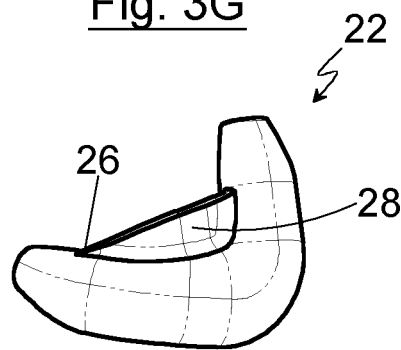
Figure 3F:
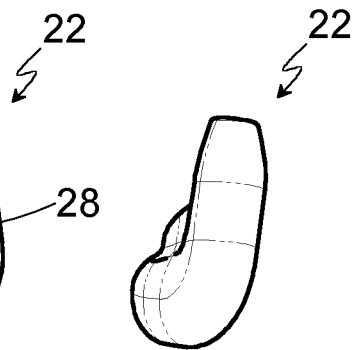
Figure 4A:
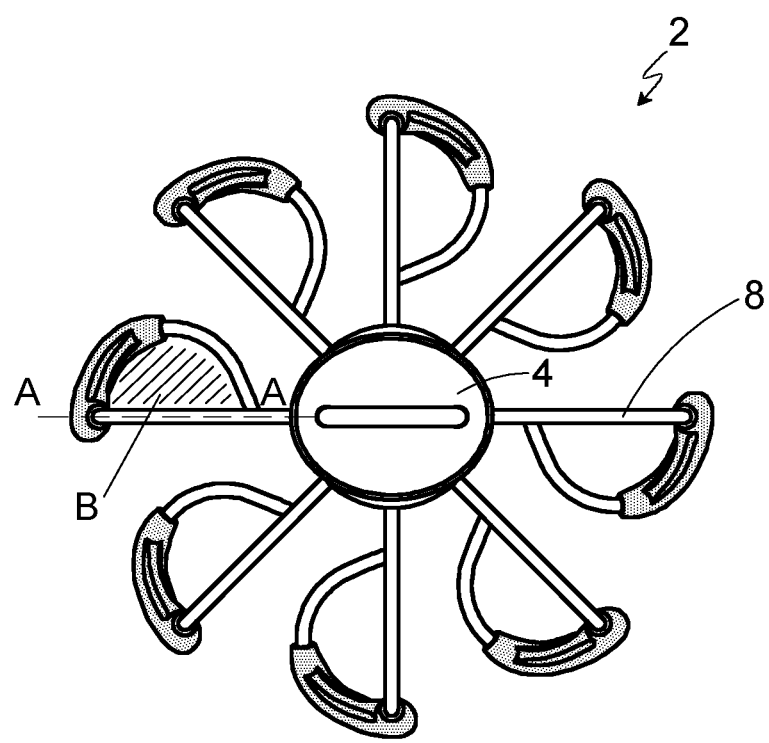
FIG. 4A is a schematic diagram viewing from the top of the whisk of FIG. 1.

FIGS. 3D, 3E, 3F and 3G are front view, left side view, right side view and top view of the surface area increasing member 22, respectively. FIG. 3D shows the front view of the surface area increasing member 22. When FIG. 1, FIG. 2, FIG. 3A, FIG. 3B and FIG. 3D are considered together, it can be seen that a convex surface 28 of the web 26 is outwardly facing. The opposite side of the convex surface 28 thus provides a concave surface 30, as shown in FIG. 3E, 3F and FIG. 3G. It is also to be noted that the surface area increasing member 22 assumes an asymmetric profile. The web 26 resembles and acts as a spoon in a whisking exercise. In this embodiment, both the convex surface 28 and the concave surface 30 are relatively smooth. However, in alternative embodiments, ribs or rugged members can be provided or formed on the surfaces 28, 30 in order to further increase the surface area of the member 22 or to yield further traction so as to additionally enhance whisking efficiency and effectiveness.

FIG. 4A is a schematic diagram viewing from the upper or rear end of the handle portion 4. It can been seen that eight wire loops 8 of the utility portion 6 extend from the handle portion 4, in that the leg portion 14 of each wire loop 8 generally defines the first plane A and the foot portion 16 of each wire loop 8 generally defines the second plane B positioned at an angle with the first plane A. Each foot portion 16 is provided with the surface area increasing member 22 having the jacket 24 that envelopes the wire loop segment 20 and the web 26 that spans across the wire loop segment 20.

Figure 4B:
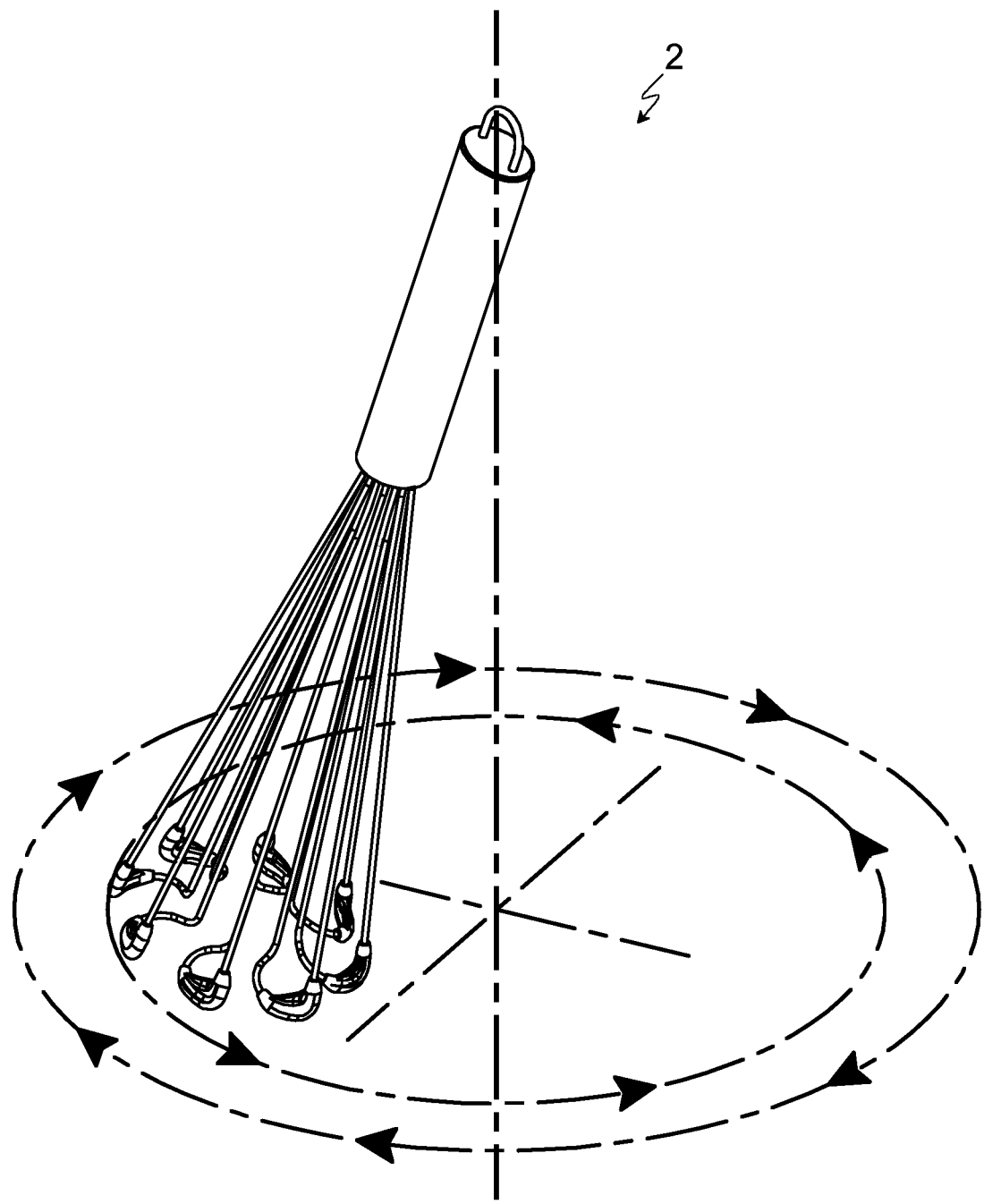
FIG. 4B is a schematic diagram showing possible mixing motions of the whisk of FIG. 1 in use.
Figure 4C:
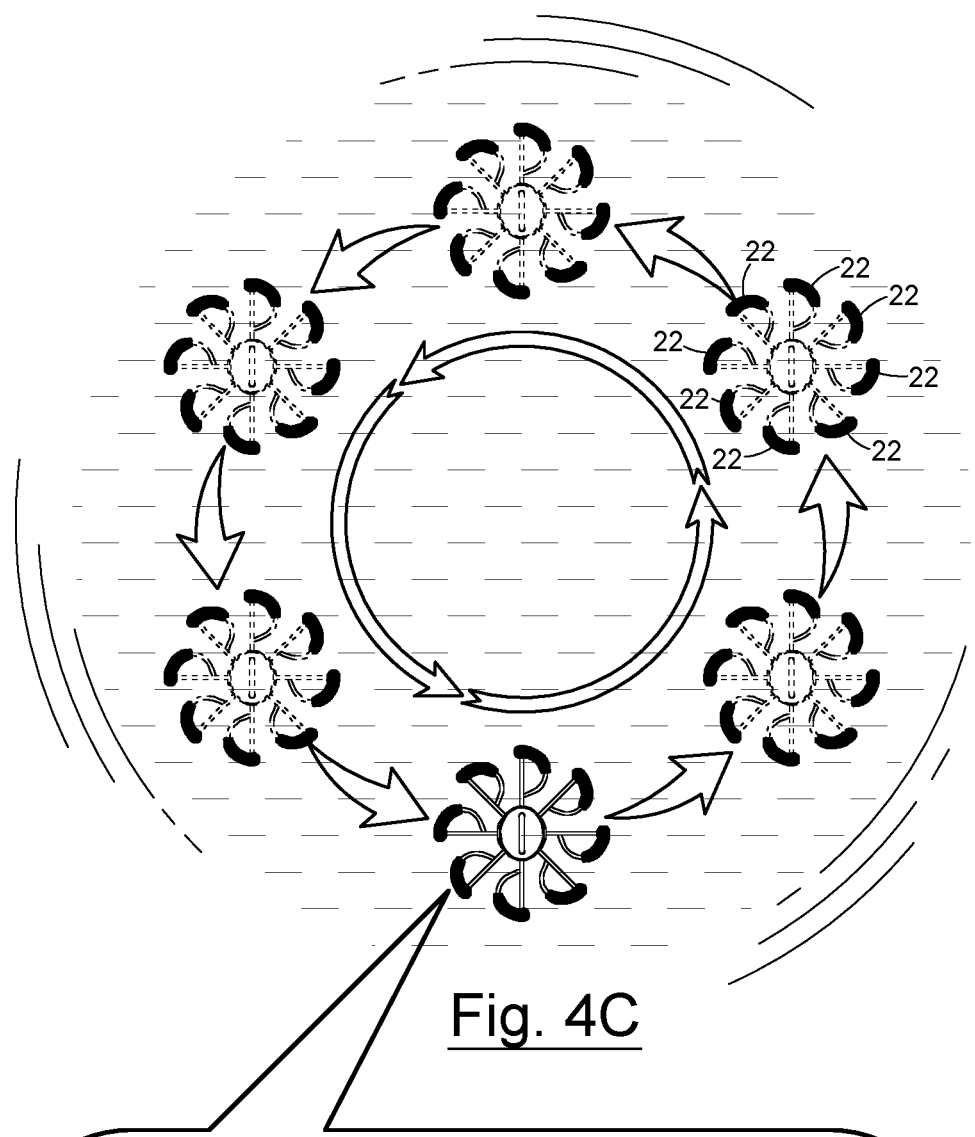
FIG. 4C is another schematic diagram showing of the one possible mixing motions of the whisk of FIG. 4B.
Figure 4D:
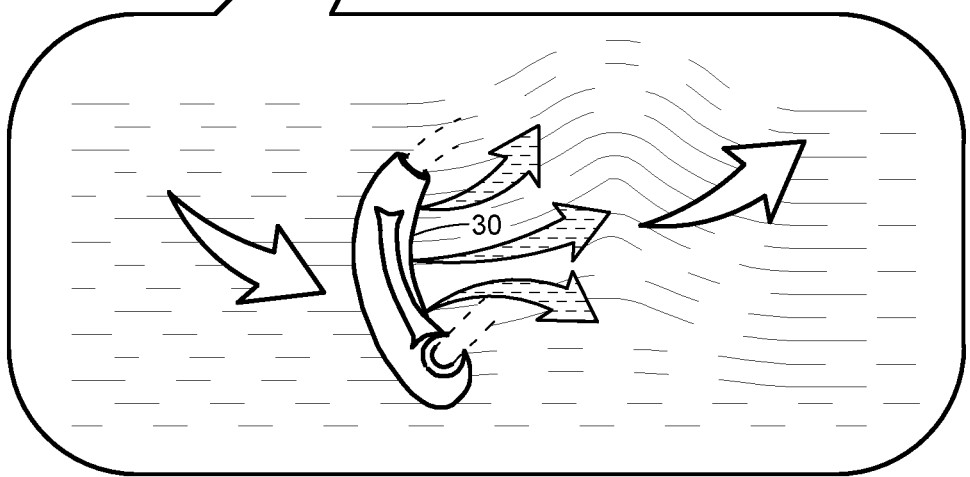
FIG. 4D is a schematic diagram showing the interaction between fluid being mixed and one surface area increasing member of the whisk of FIG. 4C.

FIG. 4B is a schematic diagram showing a clockwise or anti-clockwise circular motion of the whisk 2 in a whisking exercise. FIG. 4C illustrates the anti-clockwise motion in further detail. It is shown that in this circular motion, the surface area increasing members 22 engages with the fluid to be mixed. In particular, the concave surface 30 of some of the surface area increasing members 22 directly engages the fluid. FIG. 4D further illustrates the fluid dynamics as the concave surface 30 engages with the fluid.

Figure 4F:
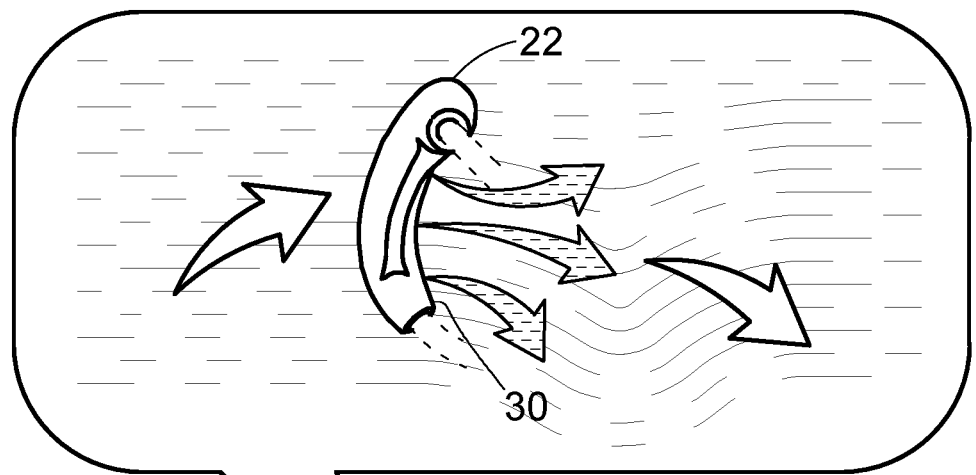
FIG. 4F is a schematic diagram showing the interaction between fluid being mixed and another surface area increasing member of the whisk of FIG. 4E.
Figure 4E:
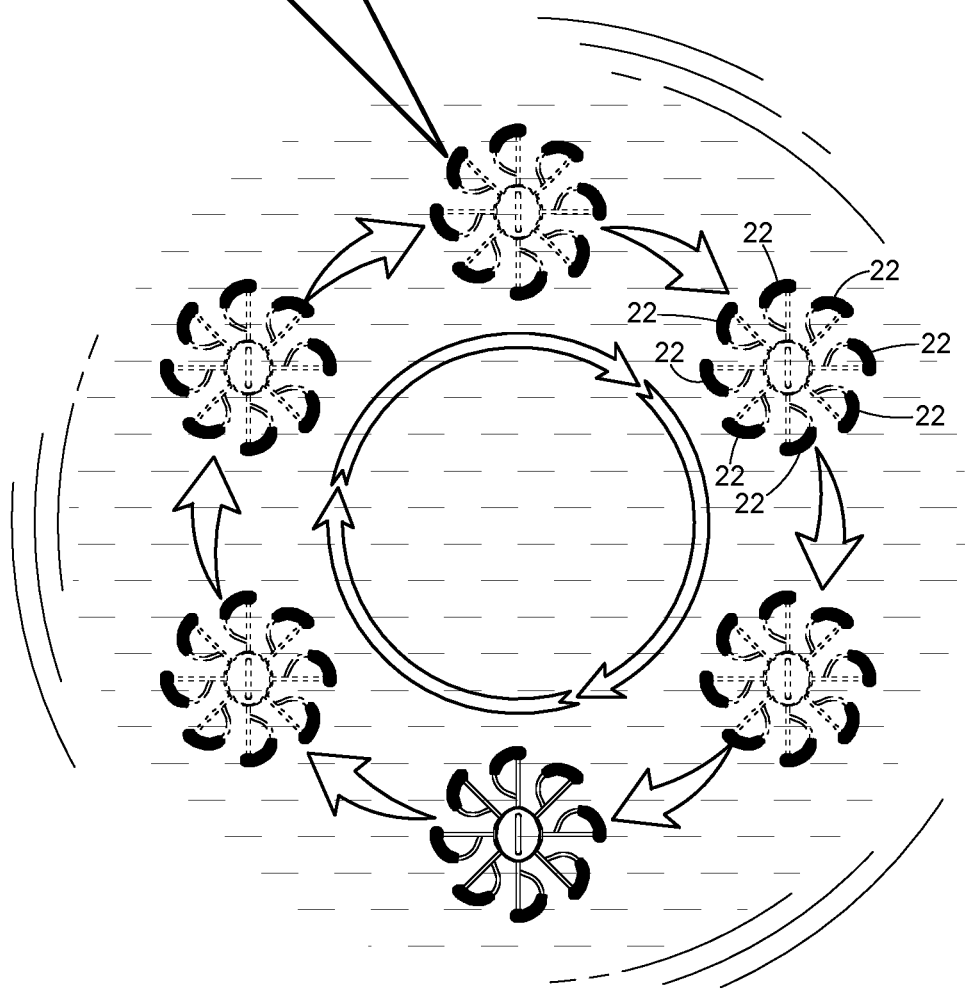
FIG. 4E is yet another schematic diagram showing another possible mixing motion of the whisk of FIG. 4B.

FIG. 4E is a schematic diagram showing a clockwise circular motion of the whisk 2 in use. FIG. 4F illustrates the circular motion in further detail. It is shown that in this other circular motion, the surface area increasing members 22 likewise engage with the fluid to be mixed. In particular, the concave surface 30 of some of the surface area increasing members 32 directly engages the fluid. FIG. 4F further illustrates the fluid dynamics as the concave 30 surface engages with the fluid.

FIG. 5A and FIG. 5B are schematic diagrams showing a side-by-side comparison of a conventional balloon whisk and the whisk 2 according to the present invention. The conventional whisk is resided in a pot with a flat bottom and a vertical circumferential wall. However, due to the round or balloon shape of the utility potion of the whisk, the utility portion or the wire loops thereof would not be able to reach the corner of the pot no matter how the whisk is oriented. This is because the balloon portion is generally round and has a relatively large radius X. It can thus be envisaged that foodstuff, e.g. batter, located at the corner within the distance X at the corner from the wall or the bottom would not be able to mix the foodstuff with those in the remaining of the container. The whisk 2 of the present invention similarly is resided in a similar pot with a flat bottom and a vertical circumferential wall. To the contrary, due to the conical shape of the utility portion 6 of the whisk 2, the wire loops 8 thereof and distal ends of the wire loops 8 in particular would essentially be able to reach all regions in the (or any) container including the corners. Essentially, there is not any radius that the distal ends cannot reach. The wire loops 8 having a conical profile or provided with the lower foot portions effectively act as spatulas to reach the corners.

FIG. 6A is a side view of the conventional whisk. FIG. 6B is a cross sectional view taken at B-B' of FIG. 6A. It can be seen that while opposite ends of the (five) wire loops extend from the distal end of the handle portion, the opposite ends are disposed in a single circular arrangement as represented by the ten round dots, with one end of the wire loop at one side of the circular arrangement and the other end of the same wire loop at the opposite side of the circular arrangement.

FIG. 7A is a side view of the whisk 2. FIG. 7B is a cross sectional view taken at A-A" of FIG. 7A. It can be seen that opposite ends of each wire loop 8 extend from the distal end of the handle portion 4 and are arranged adjacent to each other. Please see labeled outer dot 32 and inner dot 34 of the same wire loop 8. FIG. 7B shows a first (larger or outer) circular arrangement represented by eight round dots 32. These outer dots 32 represent one end from each of the wire loops 8. FIG. 7B shows a second (smaller or inner) circular arrangement represented by eight other rounds dots 34. These inner dots 34 represent the opposite end of the wire loops. Studies leading to the present invention suggests that the distance between opposite ends of each wire loop at the handle portion preferably ranging from 0-7.0 mm can allow the wire loops to achieve a more satisfactory vibration frequency and thus whisking efficiency. This configuration is technically significant. Specifically, when the opposite ends of each wire loops are arranged adjacent or close to each other, the wire loops can vibrate at a higher frequency in a whisking exercise and thus can produce a greater whisking efficiency. In this embodiment, the distance between the opposite ends of the wire loops at the handle portion is substantially 0.9 mm. However, experiments have shown that the distance may preferably be 0-7.0 mm or more preferably 0-0.9 mm.

The whisk 2 is technically advantageous in a numbers of ways. First, with opposite ends of each wire loop 8 disposed closer to each other, each wire loop 8 can vibrate at a higher frequency and thus enhance whisking efficiency. Second, the foot portion from each wire loop is provided with the performance enhancer to increase the whisking surface area and this further translates to enhanced swirling effect and mixing performance. Further, the performance enhancers (when made of a polymeric or silicon material) provided to distal ends also act as a cushion and prevent scratching of delicate container surface. Referring to FIGS. 1-3A, it can been seen that the farthest distal ends of the wire loops are covered with the enhancers, thus protecting delicate container surface form scratches or damages. Yet further, unlike the whisk of FIG. 5A, the whisk 2 has a smaller or essentially nil corner radius, meaning the utility portion 6 or the wire loops 8 thereof can reach into narrower corners of a container for mixing purposes or for cleaning out corners and this can, for example, avoid burning of residues during cooking. "Corner radius" in the context of the present invention refers to the shape and width of the utility portion—when the corner radius is smaller, it means the whisk has a narrower region which can access into a corners or difficult to reach regions of a container in a whisking exercise.

Figure 8A:
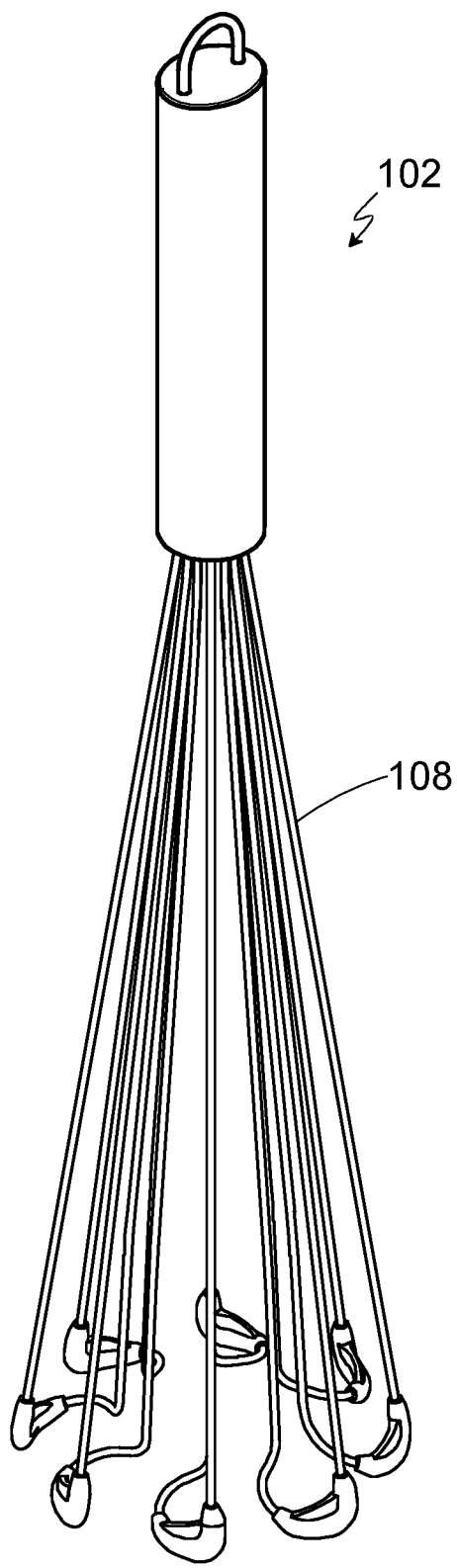
FIG. 8A is a perspective view of a second embodiment of a whisk according to the present invention.

FIG. 8A shows a second embodiment of a whisk 102 of the present invention. The whisk 102 is similar to the whisk 2 except wire loops 108 of the whisk 102 are longer than those of the whisk 2. In the context of the present invention, a whisk with longer wire loops may be more suitable to mix foodstuff which are thinner or less viscous or for use in a taller container.

Figure 8B:
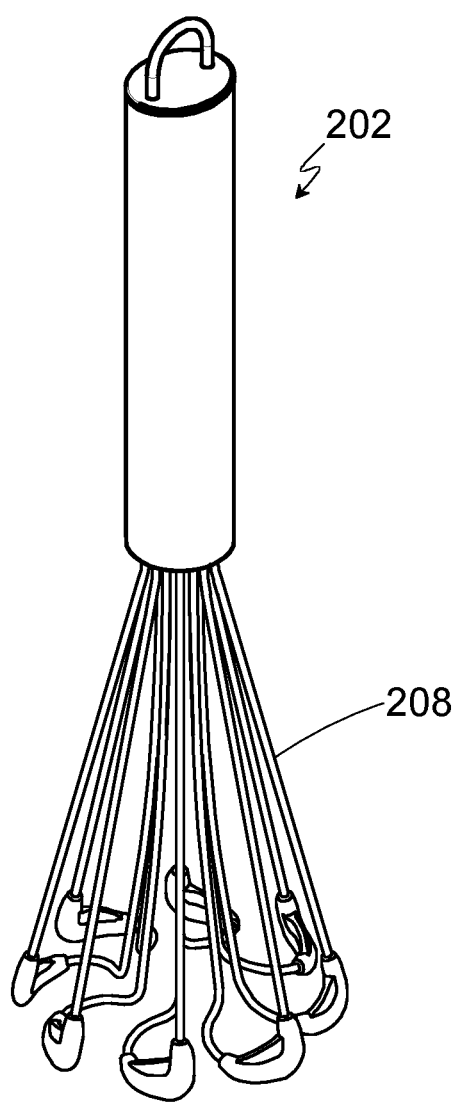
FIG. 8B is a perspective view of a third embodiment of a whisk according to the present invention.

FIG. 8B shows a third embodiment of a whisk 202 of the present invention. The whisk 202 is similar to the whisk 2 except wire loops 208 of the whisk 202 are shorter than those of the whisk 2. In the context of the present invention, a whisk with shorter wire loops may be more suitable to mix foodstuff which are thinner or less viscous or for use in a shallower container.

It is to be noted while the whisks 2, 102, 202 are different in terms of the length of their wire loops, their utility portions are still generally of conical in shape with distal end of the utility portion defining a plane. As such, when not in use, the whisks can all frelly stand on their own at the distal end of their wire loops.

FIG. 9 shows a fourth embodiment of a whisk 302 in accordance with the present invention. The whisk 302 is generally similar to the whisk 2 although there are differences. The whisk 302 similarly defines a longitudinal axis X-X' that also runs through a handle portion 304. The whisk 302 also comprises a utility portion 306 with its distal end but defining a disc generally with an oval shape. The utility portion 306 likewise has a plurality of wire loops 308 extended from, with each wire loop 308 having an upper leg portion 314 and a lower foot portion 316 extended from leg portion 314 at an angle. Further, while the upper leg portion 314 defines a plane and generally assumes a two-dimensional structure, and the lower leg portion 316 also defines a plane and generally assume a two-dimensional structure, each wire loop 308 as a whole still assumes a three-dimensional profile and is also asymmetric in structure. However, the utility portion 206 is not symmetric or conical in profile, and the disc laying on the line/plane (represented by Y-Y' in FIG. 9) defined by the end surface of the distal end of the wire loops 38 of the whisk 302 is not disposed perpendicularly to the longitudinal axis X-X' but instead is oblique to the longitudinal axis. The utility portion 306 resembles a cone but truncated at the bottom at an angle. This is because the wire loops 308 of the utility portion 306 of the whisk 302 are not equal in length. As such, due to the imbalanced distribution of weight, the whisk 302 cannot freely stand vertically on the wire loops on its own.

FIG. 10A shows a lower portion of the utility portion 306 with its surface area increasing members 322 separated therefrom. FIG. 10B is an enlarged view showing one of the surface area increasing members 322. Similar to the member 22, theses surface area increasing members are made of a jacket 324 that envelopes a wire segment 320 of the wire loop 308 and a web 326 that span across the wire segment 320.

Figure 11:
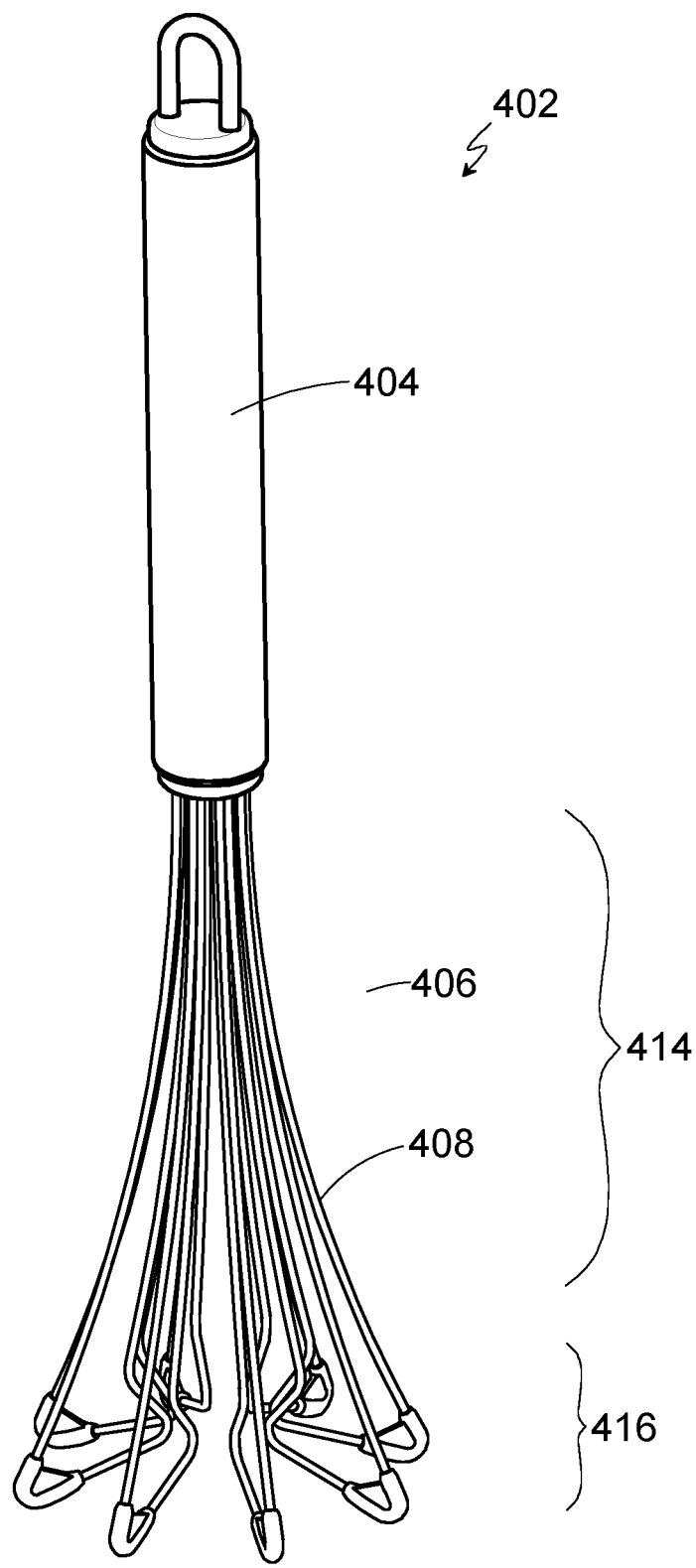
FIG. 11 is a perspective view of a fifth embodiment of a whisk according to the present invention.
Figures 12A, 12B:
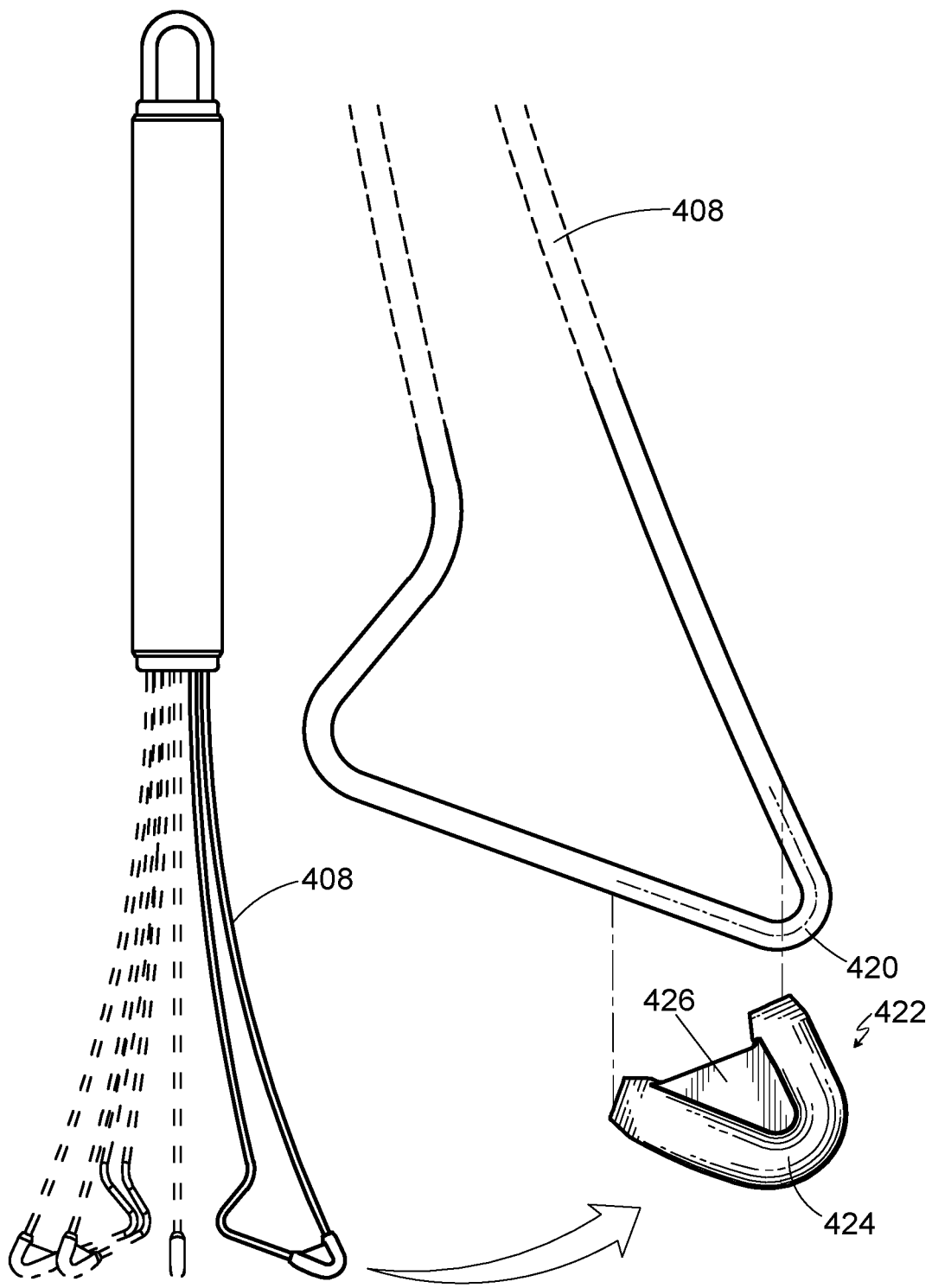
FIG. 12A is a schematic diagram of the whisk of FIG. 11, but with portions of the whisk illustrated in dashed lines and the remaining portions (handle portion and one wire loop) of the whisk illustrated in solid lines.
FIG. 12B is a schematic diagram showing an exploded view of a lower portion of the wire loop of the whisk of FIG. 12A.

FIG. 11 shows a fifth embodiment of a whisk 402 of the present invention. Similar to the whisk 2, the whisk 402 has a handle portion 404 and a utility portion 406 extended therefrom. The utility portion 406 includes eight wire loops 408. FIG. 12A shows that each wire loop 408 has an upper leg portion 414 and a lower foot portion 416. One difference is that while the upper leg portion 414 defines a plane and generally assumes a two-dimensional structure, and the lower leg portion also defines a plane and generally assume a two-dimensional structure, each wire loop as a whole also generally defines one plane and assumes a two-dimensional profile but is also asymmetric in profile. FIG. 12B shows that each wire loop 418 is provided with a surface area increasing member 422. Unlike the surface area increasing member 22, this surface area increasing member 422 has a symmetric structure in that the left side and the right side thereof are of mirror image of each other. In this embodiment, the surface area increasing member 22 does not have any convex or concave in particular.

Figures 13A, 13B:
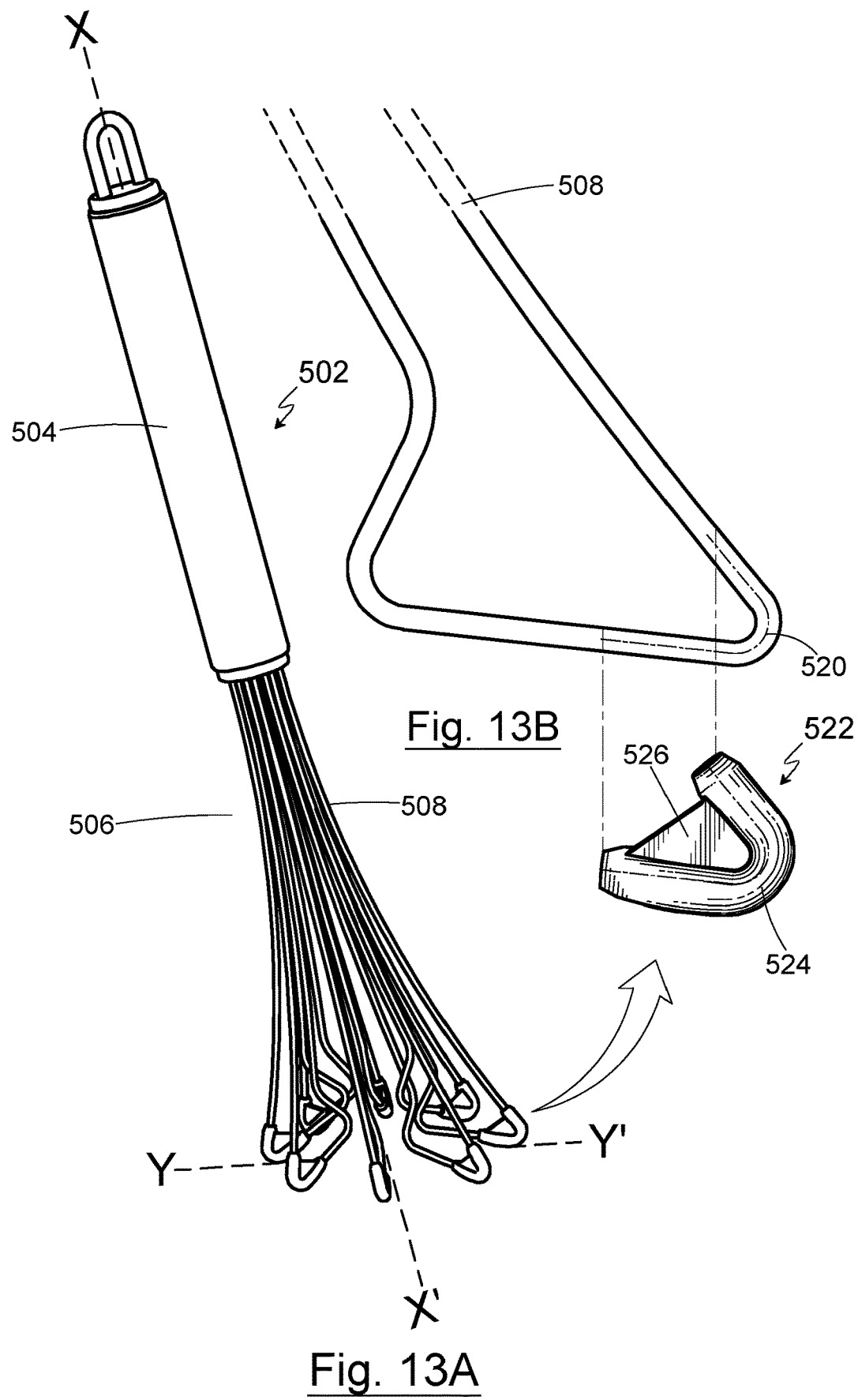
FIG. 13A is a perspective view of a sixth embodiment of a whisk according to the present invention.
FIG. 13B is a schematic diagram showing an exploded view of a lower portion of the wire loop (wire segment and surface area increasing member) of the whisk of FIG. 13A.
Figure 13C:
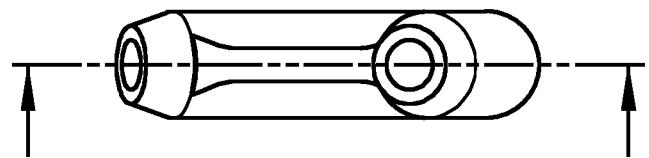
FIGS. 13C, 13D, 13E and 13F are top view, left side view, front view and sectional view of the surface area increasing member, of FIG. 13B, respectively.
Figure 13D:
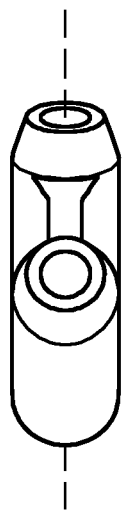
Figure 13E:
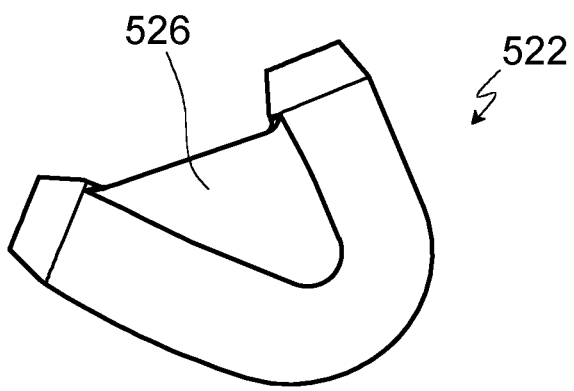
Figure 13F:
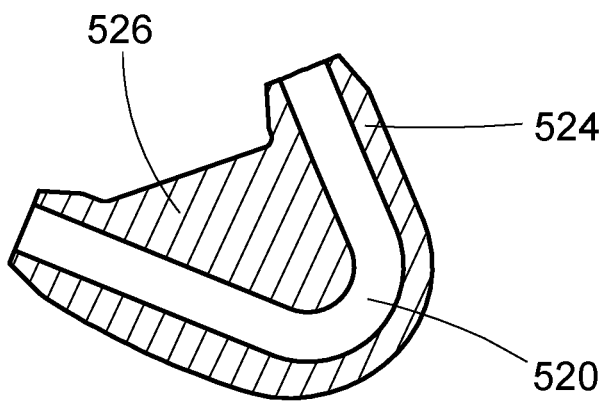

FIG. 13A shows a fifth embodiment of a whisk 502 of the present invention. Similar to the whisk 402, the whisk 502 has a handle portion 504 and a utility portion 506 extended therefrom. The utility portion 506 also includes eight wire loops 508. One main difference is that the utility potion 506 is not symmetric or conical in shape. In this regard, the whisk 502 is similar to the whisk 302. FIG. 13B shows a lower portion of a wire loop 508 thereof. FIGS. 13C, 13D, 13E and 13E are top view, left side view, front view and sectional view of a surface area increasing member 522 from the wire loop 508 respectively. FIGS. 13C and 13D show that the surface area increasing member 522 is symmetric in profile. FIG. 13D and FIG. 13E show that while a wire segment 520 of the wire loop 508 is enveloped with a jacket 524 and thus becomes thicker, a web 526 that spans across the wire segment 520 is relatively thin, or thinner, compared to the jacketed wire segment. FIG. 13F shows the configuration of the inner wire segment core 520 enveloped by the jacket 524.

FIG. 14A and FIG. 14B show a side-by-side comparison of a conventional balloon whisk and the whisk 502. Similar to the whisk 302, partly due to its asymmetric profile the whisk 502, the lower foot portions 516 of the whisk 502 are even between in being able to reach into narrower or corner regions in a container.

Figure 15C:
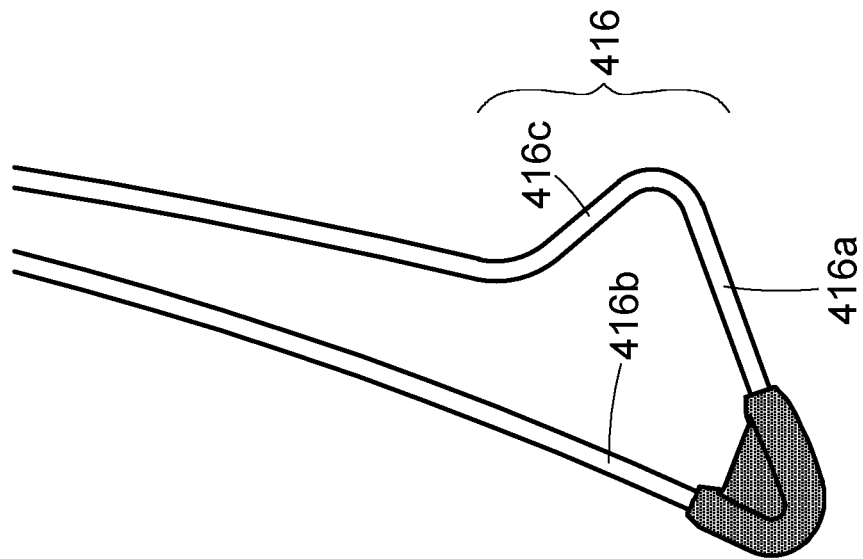
FIG. 15A, FIGS. 15B and 15C are three different embodiments of a lower portion of a wire loop according to the present invention.
Figure 15B:
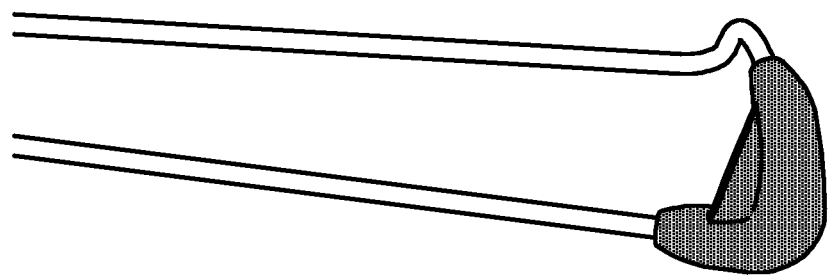
Figure 15A:
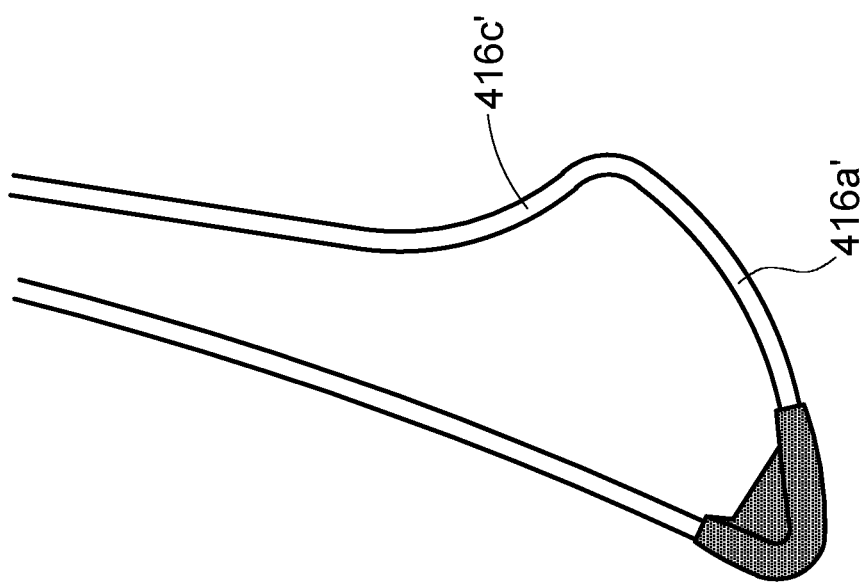

The whisks 2, 102, 202, 302, 402, 502 described above are similar in some ways but different in other ways. One difference resides in the shape of the wire loops of the utility portion. FIGS. 15A, 15B and 15C depict and summarize some embodiments of the lower foot portion of the wire loop of the utility potion. FIG. 15B shows a lower foot portion which is essentially the foot portion 216 of the whisk 2. FIG. 15C shows a lower foot portion 216 which is essentially the foot portion 416 of the whisk 402. FIG. 15A shows a lower foot portion which is somewhat similar to the foot portion 416, and yet the specific profile is different. In particular, while the foot portion 416 has a more triangular profile generally defined by three straight wire sections 416a, 416b, 416c, the foot portion is different in that the wire section (or the lower wire section) 416a' is outwardly and convexly curved, and the wire section 416c' is slightly concavely curved to transition to the leg portion shown in FIG. 15A.

Figure 16A:
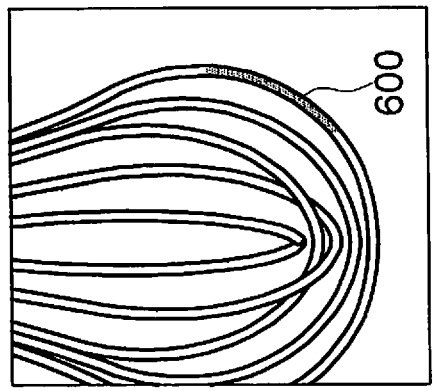
FIG. 16A and FIG. 17A are side by side comparison between wire loops of a conventional balloon whisk and an embodiment of a wire loop of a whisk of the present invention.
Figure 17A:
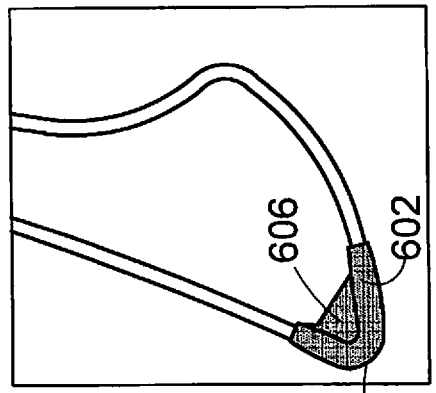

FIG. 16A and FIG. 17A are schematic diagrams showing side-by-side comparison of wire loops of a conventional balloon whisk and a wire loop of the whisk shown in FIG. 15A. In FIG. 16A, one wire is indicated with a segment 600 shown in gray. This segment 600 has a length of 16.6 mm and a diameter of 1.4 mm. In FIG. 17A, the wire loop has a segment 602 provided with a jacket 604 and a web 606 and this segment 602 also has a length of 16.6 mm and a diameter of 1.4 mm. Calculation conducted during the research and development of the present invention indicates that the surface area provided by the wire segment 600 of the conventional whisk is about 26 mm$^2$ while the surface area provided by the wire segment 602 with the jacket 604 and the web 606 is 156 mm$^2$.

Figure 16B:
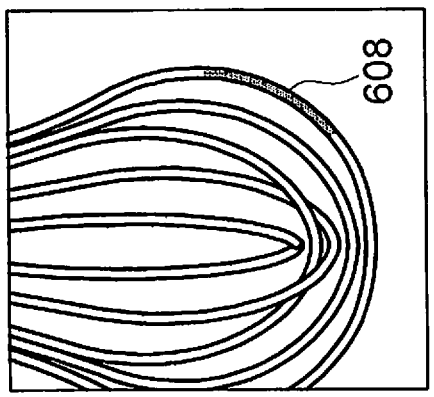
FIG. 16B and FIG. 17B are side by side comparison between wire loops of a conventional balloon whisk and an embodiment of a wire loop of a whisk of the present invention.
Figure 17B:
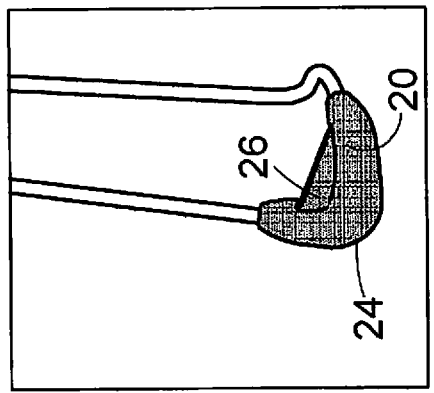

FIG. 16B and FIG. 17B are schematic diagrams seeking to compare the surface areas of a wire segment 608 of a conventional balloon whisk and the wire segment 20 of the whisk 2. The relevant segment 20 similarly has a length of 16.6 mm and a diameter of 1.4 mm. Calculation conducted during the research and development of the present invention indicates that the surface area provided by the wire segment 608 of the conventional whisk is about 26 mm$^2$ while the surface area provided by the wire segment with the jacket 24 and the web 26 of the whisk 2 is 286 mm$^2$.

Figure 16C:
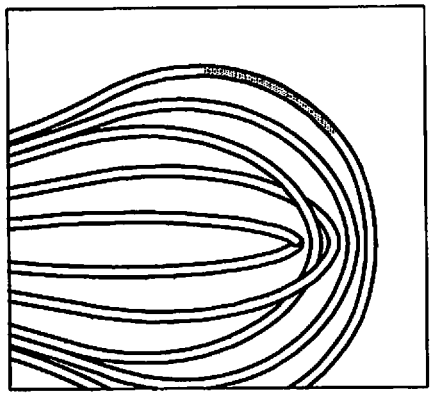
FIG. 16C and FIG. 17C are side by side comparison between wire loops of a conventional balloon whisk and an embodiment of a wire loop of whisk of the present invention.
Figure 17C:
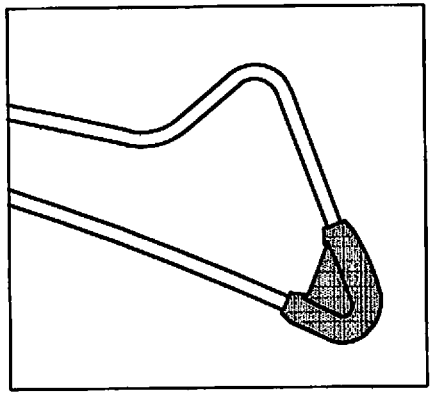

FIG. 16C and FIG. 17C are schematic diagrams seeking to provide comparison of the surface areas of a wire segment 610 of a conventional balloon whisk and the wire segment 420 of the whisk 402. The relevant segment similarly has a length of 16.6 mm and a diameter of 1.4 mm. Calculation conducted during the research and development of the present invention indicates that the surface area provided by the wire segment of the conventional whisk is about 26 mm$^2$ while the surface area provided by the jacket 424 and the web 426 is 155 mm$^2$.

From the above, it can be seen that while different jacket and web profile would affect the extent of increase of the surface area thereof, all configurations of the jacket a web of the present invention as described above can significantly increase the surface area and thus the swirling effect and whisking efficiency.

In the various embodiments of whisks described above in accordance with the present invention, each wire loop is formed, in a possible embodiment, by way of firstly bending a stainless steel wire of a predetermined length into shape, i.e. into the wire loop. For example, in the context of the whisk 2, the wire is bent into the wire loop with a three-dimensional shape having the upper leg portion and the foot portion extended at an angle from the foot portion. Then, the wire loop is further treated and placed in a mold to receive the surface area increasing member. Specifically, after placed in the mold, a polymeric material (e.g. silicone) is molded over a segment of the wire loop at the foot portion. Once over-molded thereon, the surface area increasing member is fixedly and immovably connected to the foot portion. As mentioned above, while in the aforementioned described embodiment the surface of the surface area increasing member is generally smooth, in alterative embodiments the surface may be formed or processed such that it carries ribs or it is textured for enhancing traction or interaction with foodstuff to be mixed. After over-molding, the finished wire loops can then be assembled to the handle thus forming the whisk.

Alternatively, studies leading to the present invention show that both the wire loop and the surface area increasing member can be molded integrally entirely with a plastic(s) or polymeric materials or the combination of the wire loop and the surface area increasing member has an integral structure of a single material. In this manner, the entire wire loop and surface area increasing member combination is formed by way of, for example, injection molding, thus doing away the steps of wire bending and overmolding. As a further alternative, the surface area increasing member can be executed in different materials, for example, a welded stainless steel sheet, casted web or other materials allowing the formation of the surface increasing member on the food portion.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose. Further, reference regarding to the orientation or position of a feature is relative. For example, when referring to a front end and a rear end of an elongate structure, it means the front and rear ends are disposed and opposite ends of the structure.

The invention claimed is:

1. A culinary whisk with an elongate profile defining a longitudinal axis and having a proximal end and a distal end, comprising a handle portion and a utility portion, wherein said utility portion includes a plurality of wire loops, wherein each said wire loop has an asymmetric profile and includes an upper elongate leg portion and a lower foot portion, wherein each said wire loop is additionally provided with a web member thereon defining an outwardly facing convex surface and a concave surface opposite to the convex surface, wherein said web member has an asymmetric profile and includes a first part jacketing and enveloping the wire segment and increasing the circumference of the wire segment and a second part spanning across jacketed wire segment of said lower foot portion, and wherein a center portion of the web member is thinner than the jacketed wire segment.

2. A culinary whisk as claimed in claim 1, wherein said wire loops are non-overlaying with each other, and wherein said lower foot portions are outwardly oriented and/or radially extending.

3. A culinary whisk as claimed in claim 1, wherein said wire loops extend from a front end of said handle portion with a narrower width or diameter of said whisk and expand to the distal end with a largest width of said whisk, wherein said lower foot portions of said wire loops together define the largest width of said whisk, and wherein said lower foot portions are arranged at the farthest location from said handle portion.

4. A culinary whisk as claimed in claim 1, wherein said longitudinal axis runs along said handle portion, wherein said wire loops are of equal length with the distal end thereof defining a plane disposed perpendicularly to the longitudinal axis whereby said whisk can stand vertically on itself at the distal end, and wherein said wire loops together generally resemble a symmetric or conical structure.

5. A culinary whisk as claimed in claim 1, wherein said wire loops are of non-equal length with the distal end thereof defining a plane disposed non-perpendicularly or oblique to the longitudinal axis, and wherein said wire loops together generally resemble an asymmetric structure.

6. A culinary whisk as claimed in claim 1, wherein each of said wire loops defines a structure with a three-dimensional profile.

7. A culinary whisk with an elongate profile defining a longitudinal axis and having a proximal end and a distal end, comprising a handle portion with a rear end and a front end and a utility portion, wherein:
    said utility portion includes a plurality of non-overlaying wire loops,
    each said wire loop includes an upper elongate leg portion extending from the front end of said handle portion and a lower foot portion, and
    each said wire loop is provided with a web member thereon, the web member has an asymmetric defining an outwardly facing convex surface and a concave surface opposite to the convex surface and spanning across and jacketing and enveloping a wire segment of said lower foot portion, wherein a center portion of the web member is thinner than the jacketed wire segment of said lower portion.

8. A culinary whisk as claimed in claim 7, wherein, along the longitudinal axis,
    said wire loops extend from the front end of said handle portion with a narrower width or diameter of said whisk and expands to the distal end with a largest width of said whisk,
    said lower foot portions together define the largest width of said whisk, and
    said web member is made of a polymeric material.

9. A culinary whisk as claimed in claim 7, wherein said wire loops are of equal length with the distal end defining a plane disposed perpendicularly to the longitudinal axis whereby said whisk can stand vertically on the distal end, and wherein said wire loops together generally resemble an asymmetric structure or conical structure.

10. A culinary whisk as claimed in claim 7, wherein said wire loops are of non-equal length with the distal end defining a plane disposed non-perpendicularly or oblique to the longitudinal axis, and wherein said wire loops together generally resemble an asymmetric structure.

11. A culinary whisk as claimed in claim 7, wherein each of said wire loops defines a structure with a three-dimensional profile.

12. A culinary whisk as claimed in claim 7, wherein when the culinary whisk is in use the web member is vertically disposed with the concave surface thereof facing the circular whisking motion.

* * * * *